Patented July 5, 1932

1,865,667

UNITED STATES PATENT OFFICE

GUSTAV BAILLEUL, OF FRANKFORT-ON-THE-MAIN, GERMANY, ASSIGNOR TO AMERICAN LURGI CORPORATION, OF NEW YORK, N. Y., A CORPORATION OF NEW YORK

ACTIVATION OF CARBONACEOUS MATERIAL

No Drawing. Application filed September 23, 1930, Serial No. 483,979, and in Germany October 4, 1929.

This invention relates to the production of a cheap adsorptive carbon, conjointly with the recovery of a gas containing hydrogen and particularly suitable for heating purposes.

A need exists, for certain purposes in the arts, for active carbons, in respect of which a low price is more essential than particularly high activation, and for which purposes the comparatively high cost of high-grade active carbons generally renders their employment unremunerative. Apart from those cases where already the high price of the carbons militates against their use, there are others to be considered in which the material is subjected to particularly heavy wear in use, or where—as is the case, for example, in the elimination of tarry constituents from effluents and the like—the separation of the constituents taken up by the adsorbent is attended with such difficulty that, given a sufficiently cheap carbon, it is preferable to replace the spent carbon completely by a fresh quantity, rather than employ reactivation.

It has now been ascertained that a carbon, which is particularly suitable for such purposes and exhibits adequate adsorptive capacity combined with low cost, can be produced by treating low-priced carbonaceous substances, such as low-temperature coke, semi-coke, brown-coal and the like—preferably with a high ash content—with mixtures of steam and gas, containing free oxygen, but not more than 6% by volume of the gaseous mixture, at temperatures of about 400–700° C., preferably about 500–600° C., the action being restricted to a degree corresponding to the special purpose in view, the activating steam-gas mixture being supplied at relatively low temperatures, not exceeding 250° C. and, for example, being between 120 and 200° C. In such case there is obtained, in addition to an adsorptive carbon with a degree of activation that is adequate for the purpose in view, a waste gas which contains free hydrogen and is applicable for numerous purposes—especially heating—the utilization of which reduces the cost of the activated carbon obtained to such an extent as to enable the latter to be employed with advantage even for those purposes where the high cost of the more active adsorptive carbons produced by known processes precludes their use.

It has already been proposed to produce adsorbents from ashy carbonaceous substances of the above mentioned character, by designedly subjecting the originating materials to a particularly extensive oxidation, by treatment with gases containing, for example, up to 15% by volume of oxygen, steam being employed as a diluent if necessary, and at temperatures of about 500–800° C. so that the loss of originating substance, in burning, exceeds 40%, or that the content of ash, soluble in hydrochloric acid, of the finished product is higher than 30%. The process of the present invention differs from this prior proposal in that the activating gases, containing oxygen and steam, are brought into action on the substance to be activated, with a specific temperature not exceeding 250° C.,— and preferably at about 120–200° C.—the supply of further, extraneous heat being preferably avoided. In such case, therefore, the requisite activation temperatures are generated, for the most part at least, solely by the heat of the combustion process in addition to that supplied in the activating gases, it being, moreover, preferable that the loss of originating material, through burning, should not exceed 20–40% of the initial weight.

The necessary oxygen may be supplied, for example, in the form of air, or of free oxygen, or of air enriched with oxygen. Apart from oxygen (or air) and steam, the gaseous mixtures employed for the activation may, if desired, contain other gases which take part in the activation process, such as carbon dioxide, or also inert gases such as nitrogen.

The activation process may be carried out either at ordinary, elevated or reduced pressure. In general, the procedure will be such that the desired temperature in the activating zone is maintained—for the most part at least—without the application of auxiliary heating, and solely by utilizing the energy liberated during the activation and the sensible heat content of the introduced mixture of steam and gas, external heating of the reaction chamber being resorted to only in so far as the same may appear necessary in order to prevent transmission of heat from the reaction chamber to the outside, or in order to increase the temperature in certain zones of the reaction chamber.

The originating materials are preferably treated in a stationary layer of suitable dimensions, or in a state of motion if desired. The conditions should always be such that the actual activation process takes place in a more or less sharply defined spatial zone, which in the case of material in a state of repose, progresses during the course of the activation from the point of admission of the gases onwards, in the direction of flow of the activating gases, over the entire length of the material under treatment up to the point of exit of the gases. Alternatively, the material may be moved in counterflow to the gases, through the reaction chamber at such a rate that the reaction zone remains in one position. In this manner the process is rendered continuous, all that is necessary being to introduce a continuous supply of fresh charge material at one end of the reaction chamber and discharge a corresponding amount of the finished activated material at the other end.

In this continuous method of operating, the charge material may be passed through the reaction chamber in the form of a closed mass, or, if desired, in another manner, such as by means of a rotary tube, provided only that care be taken that the movement of the material is such as not to prevent the formation of a definite activation zone. Hence, any substantial intermingling of the material in the direction of flow of the activating gases, which would militate against the formation of such a spatially defined activation zone must be avoided at all costs.

The resulting restriction of the activation process to a definite zone offers the advantage that, on the one hand, the heat content of the already completely activated material is taken up, and the said material simultaneously cooled by the incoming gases, and is thus continuously returned to the activation zone, while on the other hand, the hot gases on the way to the outlet part with their heat to the charge material before the latter reaches the activation zone. In this manner the heat content of these gases is also utilized for the activation process, so that the entire operation proceeds with maximum heat economy, and the activation gases can be admitted with the lowest specific temperatures imaginable.

In carrying out the process in the hereindescribed manner, it will usually be necessary in the first place to pre-heat ("ignite") the charge material—disposed for example, in a suitable apparatus, over a grate or in passing through a reaction chamber—at a certain point, to the desired activation temperature, for example by a blast of gases (preferably air) which contain oxygen, whereupon the supply of air is cut off and the activating gases are admitted at a suitably controlled rate. In the case of intermittent working, the admission is continued until the activation has attained the desired degree throughout the entire mass, while in continuous working, the forward movement of the charge and the velocity of the activating gases are kept under such control that the desired temperature is continuously maintained in the stationary activation zone that has been established.

By suitably regulating the other operative conditions, such as the composition of the mixture of steam and gas—and especially the content of free oxygen and steam therein— and the rate of flow of the introduced gaseous mixture, the temperature of the activation zone, the duration of the activation process and the extent of loss in burning, can be kept within the limits desired for the time being.

Other working conditions being equal, the loss of originating material through burning is generally the smaller in proportion as the temperature of the activating mixture employed is lower, its steam content higher and its oxygen content lower. The activation temperature depends not only on the nature of the originating material, and the temperature and velocity or volume of the gaseous activating mixture admitted, but also on the composition of the latter, in that said temperature rises with the amount of oxygen present, and conversely diminishes with the amount of steam therein.

Since the volume of waste gas, containing hydrogen, which is produced in addition to the active carbon in operating in the hereindescribed manner, is in inverse proportion to the extent to which the carbon is burned off, it is possible—according to the adjustment of the working conditions—to regulate the aforesaid factors either so as to obtain comparatively large volumes of utilizable waste gas accompanied by an increased loss through burning of the originating material treated, or to obtain a higher yield of active carbon with a correspondingly smaller loss through burning. This loss however, should not, in general, exceed 40% of the dry weight of the originating material, and preferably not more than 20–30% of same.

*Example 1*

Air, preheated to 150° C. was blown for an hour through a layer of low-temperature coke, about 1 metre in depth, disposed on a grate in an activation apparatus. At the end of that period, the temperature of the mass being about 130° C. the layer of coke on the grate became ignited. The actual activation then ensued by introducing a gaseous mixture of 80% by volume of steam and 20% by volume of air preheated to 120° C.

By regulating the admission of the gaseous mixture the temperature in the activation zone was maintained at about 500° C. At the end of 4 hours, the activation zone had moved forward from the grate throughout the entire layer of coke, the temperature of the entire mass of carbon had receded to the initial level and the activation process had been completed. The loss through burning amounted to about 18%, referred to the raw material treated. About 1.5 cubic metres of a waste gas containing 21% of hydrogen, was obtained per 1 kg. of active carbon produced.

*Example 2*

In another instance, after ignition as in Example 1, the low-temperature coke in the activation apparatus was treated with a mixture of 95% of steam and 5% of pure oxygen. The activation temperature was maintained at 600° C. The loss in burning amounted to 40% of the originating material. About 6 cubic metres of a waste gas containing 30% of hydrogen, were obtained per kg. of active carbon produced.

In certain cases the process may be suitably carried out by placing the activation chamber in close communication with the producer of the originating material for the activation process. For example, in activating low-temperature coke, the activation process can be performed in an apparatus, which is disposed below the carbonization shaft and receives the coke direct from said shaft. This method affords the economical and technical advantage of utilizing, for the activation process, the heat inherent in the orginating material from the producing operation of same. The activating gases may also be supplied to, or derived from, the low-temperature carbonization process.

According to the purposes for which the resulting active carbon is intended, the latter may also be subjected to a chemical or mechanical, or chemical and mechanical process of improvement of any kind, for instance by screening or washing by means of water or chemicals, such as acids, soda, etc., or to supplementary activation and the like.

By suitably classifying the originating material, for example, by screening, prior to activation, the finished active carbon can be obtained of suitable grain-size direct.

According to the method of performing the process, the waste gases from the activation process contain, in addition to hydrogen and any surplus steam, varying amounts of carbon dioxide and, in some cases, of other gases as well. In so far as is necessary in view of the purpose for which the gases are intended, such constituents can be removed in known manner, by physical or chemical measures, or both.

I claim:—

1. A process for the activation of carbonaceous material and the conjoint production of combustible gases, which comprises treating carbonaceous substances at temperatures of about 400–700° C., with a mixture of steam and gas containing free oxygen in an amount not exceeding 6 percent by volume and introduced at a temperature not exceeding 250° C., for such a period that the loss in burning does not exceed 40% by weight of the original carbonaceous substance.

2. A process for the activation of carbonaceous material and the conjoint production of combustible gases, which comprises treating carbonaceous substances at temperatures of about 400–700° C., with a mixture of steam and gas containing free oxygen in an amount not exceeding 6 percent by volume and introduced at a temperature not exceeding 250° C., for such a period that the loss in burning does not exceed 20% to 30% by weight of the original carbonaceous substance.

In testimony whereof, I affix my signature.

GUSTAV BAILLEUL.